(12) United States Patent
Krokosz

(10) Patent No.: US 10,207,343 B2
(45) Date of Patent: Feb. 19, 2019

(54) PIPE ISOLATION AND INTERVENTION

(71) Applicant: STATS (UK) Limited, Aberdeen, Aberdeenshire (GB)

(72) Inventor: Douglas Corey Krokosz, Thompson (CA)

(73) Assignee: Stats (UK) Limited, Aberdeen, Aberdeenshire (GB)

(*) Notice: Subject to any disclaimer, the term of this patent is extended or adjusted under 35 U.S.C. 154(b) by 25 days.

(21) Appl. No.: 14/989,118

(22) Filed: Jan. 6, 2016

(65) Prior Publication Data

US 2016/0193672 A1    Jul. 7, 2016

(30) Foreign Application Priority Data

Jan. 7, 2015 (GB) .................................. 1500222.3

(51) Int. Cl.
*F16L 55/18* (2006.01)
*B23D 21/06* (2006.01)

(52) U.S. Cl.
CPC .............. *B23D 21/06* (2013.01); *F16L 55/18* (2013.01); *Y10T 137/0458* (2015.04); *Y10T 137/0463* (2015.04); *Y10T 137/0469* (2015.04); *Y10T 137/612* (2015.04); *Y10T 137/6123* (2015.04); *Y10T 408/5627* (2015.01)

(58) Field of Classification Search
CPC ......... Y10T 137/6123; Y10T 137/0469; Y10T 137/612; Y10T 137/0463; Y10T 137/0458; Y10T 408/5627; F16L 41/04; F16L 55/132; F16L 55/18; F16L 19/061; F16L 19/065; F16L 19/0653; F16L 19/07; B23D 21/06

USPC .............. 285/341, 342, 343; 137/15.14, 318; 138/89, 92, 97; 408/100
See application file for complete search history.

(56) References Cited

U.S. PATENT DOCUMENTS

| | | | | |
|---|---|---|---|---|
| 2,899,983 A | * | 8/1959 | Farris | F16L 55/124 137/318 |
| 3,687,166 A | | 8/1972 | Herrin | |
| 3,989,283 A | * | 11/1976 | Pepper | F16L 33/006 285/323 |
| 4,516,598 A | | 5/1985 | Stupak | |
| 4,552,170 A | * | 11/1985 | Margrave | F16L 55/105 137/318 |
| 4,889,370 A | * | 12/1989 | Firestone | F16L 55/171 138/99 |
| 5,269,340 A | | 12/1993 | Drzewiecki | |

(Continued)

FOREIGN PATENT DOCUMENTS

GB     2290361 A     12/1995

OTHER PUBLICATIONS

United Kingdom Search Report for GB Application No. 1500222.3 dated Jun. 24, 2016.

*Primary Examiner* — Matthew W Jellett
(74) *Attorney, Agent, or Firm* — Carlson, Gaskey & Olds, P.C.

(57) ABSTRACT

A tool assembly configured for location on a section of a pipe is operable to both isolate a section of the pipe and perform an intervention into the pipe while maintaining pressure integrity. The tool assembly includes a clamp, a cutting tool and an isolation tool. In use, the clamp sealingly secures the tool assembly to the pipe, the cutting tool performs an intervention operation on the pipe, and the isolation tool isolates the section of pipe in order that repair or replacement of equipment can be effected.

19 Claims, 14 Drawing Sheets

(56) References Cited

U.S. PATENT DOCUMENTS

| | | | |
|---|---|---|---|
| 5,316,037 A | 5/1994 | Martin | |
| 5,732,728 A * | 3/1998 | Maichel | F16L 55/105 |
| | | | 137/15.14 |
| 6,041,806 A * | 3/2000 | Maichel | F16K 27/067 |
| | | | 137/15.22 |
| 6,257,266 B1 * | 7/2001 | Valdez | F16L 55/132 |
| | | | 137/15.08 |
| 6,726,253 B2 * | 4/2004 | Inoue | F16L 33/03 |
| | | | 285/117 |
| 9,671,049 B1 * | 6/2017 | Crompton | F16L 19/07 |
| 2006/0138771 A1 * | 6/2006 | Galante | F16L 19/065 |
| | | | 285/249 |
| 2010/0148492 A1 * | 6/2010 | Hove | F16L 19/065 |
| | | | 285/24 |

* cited by examiner

PIPE ISOLATION AND INTERVENTION

REFERENCE TO RELATED APPLICATION

The application claims priority to United Kingdom Application No. 1500222.3 which was filed on Jan. 7, 2015.

FIELD OF THE INVENTION

This invention relates to pipe isolation and intervention. More particularly, but not exclusively, embodiments of the invention relate to a tool assembly and method for use in the isolation of, and intervention into, small bore pipe such as may be used in gas supply and distribution.

BACKGROUND TO THE INVENTION

Small bore pipe is used to transport fluids in a wide range of applications in both industrial and domestic environments, including for example the supply and distribution of low pressure gas, in the transportation of toxic fluids and/or the supply and distribution of water, such as potable water.

During the installation, working life or decommissioning of such pipe, it may be necessary to isolate a section of the pipe for repair, replacement and/or to permit an intervention into the pipe to be carried out.

However, the isolation of, and intervention into, small bore pipe provides a number of challenges to conventional isolation and intervention equipment and techniques. For example, conventional equipment and techniques are typically complex and require specialist contractors to install and operate. Moreover, conventional isolation and intervention equipment and techniques used in low pressure gas supply and distribution suffer from the drawback that they permit escape of gas to atmosphere, posing a significant risk to personnel and the environment; the alternative being the complete shutdown of operating equipment at significant expense to the operator. Equipment and techniques have been proposed for use in low pressure water applications. However, these fail to provide sufficient pressure integrity to permit their use in gas supply and distribution applications. Such equipment and techniques also require that isolation equipment in maintained in-situ after intervention operations have been completed and so do not comply with safety codes for gas or other hydrocarbon systems.

SUMMARY OF THE INVENTION

According to a first aspect of the present invention, there is provided a tool assembly for use in the isolation of, and intervention into, a pipe. The tool assembly includes a clamp configured for location about a pipe, a cutting tool operatively associated with the clamp, the cutting tool configured to sever the pipe into a first pipe section and a second pipe section, and an isolation tool operatively associated with the clamp. The isolation tool includes a seal element configured for location between the first pipe section and the second pipe section to isolate a section of the pipe.

Beneficially, embodiments of the present invention provide a compact tool assembly capable of both cutting a small bore pipe safely and eliminates or at least mitigates the risk of loss of pressure or escape of gas to the atmosphere or surrounding environment.

The clamp will be configured to be disposed around a pipe, such as a small bore pipe, and may be engaged with the pipe to secure the tool assembly to the pipe.

The clamp may be configured to engage an outer surface of the pipe, the ability to engage the outside of the pipe permitting the use of the tool assembly in applications where access to the inside of the pipe is restricted, such as in small bore pipe applications.

The clamp may be of any suitable form and construction.

In particular embodiments, the clamp may include a split sleeve clamp. The clamp may, for example, include a first sleeve portion and a second sleeve portion. The first and second sleeve portions may be configured to extend at least partially circumferentially around the pipe and in particular embodiments the first and second sleeve portions may surround the pipe.

In embodiments including first and second sleeve portions, the first and second sleeve portions of the clamp will be secured together, and for example, but not exclusively, the first and second sleeve portions may be detachably secured together. In particular embodiments, the first and second sleeve portions may be secured together by bolts. However, any suitable means for securing the sleeve portions may be used. Beneficially, the provision of a split sleeve clamp permits the tool assembly to be located at any location along the pipe, including at a given mid-line location.

A lock arrangement may be provided for securing the tool assembly to the pipe. The lock arrangement may be provided with or form part of the clamp. The lock arrangement may be configured for location within the clamp, that is, the lock arrangement may be interposed between an inner surface of the clamp and the outer surface of the pipe. Providing a lock arrangement within the clamp, for example, provides a compact tool assembly for use in small bore pipe applications where access may be restricted. Moreover, providing a lock arrangement which is captive within the clamp assists in the retention of the lock arrangement when the clamp is removed and prevents the lock restraint from being broken as in conventional equipment designs.

The lock arrangement may be of any suitable form and construction. In particular embodiments, however, the lock arrangement may include a taper lock. In such embodiments, the lock arrangement may include a first lock member, which may include or define a lock bowl of the lock arrangement, and a second lock member. A tapered inner surface of the first lock member is configured to co-operate with a tapered outer surface of the second lock member to urge the second lock member into engagement with the pipe to secure the tool assembly to the pipe.

In particular embodiments, the first lock member includes a plurality of separate elements or segments. For example, the first lock member, or lock bowl, may include a dual segment arrangement. Beneficially, providing the first lock member as a plurality of elements or segments facilitates assembly in embodiments where the clamp takes the form of a split sleeve clamp since one or more element may be pre-assembled or otherwise operatively associated with each of the first and second sleeve portions and/or facilitates removal of the clamp when required. In other embodiments, the first lock member, or lock bowl, may include a unitary member.

In particular embodiments, the second lock member may include a plurality of lock elements or segments. For example, the second lock member may include a dual segment arrangement. Providing the second lock member as a plurality of elements or segments facilitates assembly in embodiments where the clamp takes the form of a split sleeve clamp since one or more element may be pre-assembled or otherwise operatively associated with each of the first and second sleeve portions and/or facilitates removal of the clamp when required. In other embodiments, the second lock member may include a unitary member.

The second lock member may be configured to securely engage the pipe. For example, an inner surface of the second lock member—or at least one of the second lock member elements or segments in embodiments were a plurality of lock elements or segments are provided—may include or may be provided with a profile which facilitates gripping of the pipe. The profile may include a tooth profile, for example. However, any suitable means for gripping the pipe may be provided.

The first lock member elements or segments may be coupled together by a coupling ("a first lock member coupling"). The first lock member coupling may include a slot and pin restraint, for example. Beneficially, the coupling permits sufficient axial movement to set the lock bowl arrangement, while preventing the first lock member elements or segments from disengaging.

The second lock members—or segments in embodiments where the second lock member include a plurality of elements or segments—may be coupled to the clamp ("a second lock member coupling"). In particular embodiments, the second lock member coupling may be provided by one or more radial screw. However, any suitable means for coupling may be utilized. Beneficially, the coupling permits sufficient movement for the lock arrangement to engage the pipe but prevent the lock arrangement from becoming detached when the clamp is released.

In particular embodiments, the tool assembly will include a first lock arrangement and a second lock arrangement. One, and in particular embodiments both, of the first and second lock arrangements may include a lock arrangement as described above. The first lock may include or define an upstream lock of the tool assembly. In use, the first lock arrangement may be arranged to secure the clamp to the pipe prior to cutting the pipe with the cutting tool and to the first pipe section following the cutting of the pipe by the cutting tool. The second lock arrangement may include or define a downstream lock of the tool assembly. In use, the second lock arrangement may be arranged to secure the clamp to the pipe prior to cutting the pipe with the cutting tool and to the second pipe section following the cutting of the pipe by the cutting tool.

A seal arrangement may be provided for sealing between the tool assembly and the pipe. The seal arrangement may be provided with or form part of the clamp. The seal arrangement may be configured for location within the clamp, that is, the seal arrangement may be interposed between an inner surface of the clamp and the outer surface of the pipe. Providing a seal arrangement which is captive within the clamp assists in the retention of the seal arrangement when the clamp is removed and prevents the seal from being broken.

The seal arrangement may be of any suitable form and construction. A seal element of the seal arrangement may include an elastic or elastomeric seal element. In particular embodiments, the seal arrangement may include a compression seal element. In use, axial force transmitted to the seal element may axially compress and radially expand the seal element into engagement with the pipe, that is, the radially inner surface of the seal element moves radially inwards to engage the pipe.

In particular embodiments, the tool assembly will include a first seal arrangement and a second seal arrangement. One, and in particular embodiments both, of the first and second seal arrangements may include a seal arrangement as described above. The first seal arrangement may include or define an upstream seal arrangement of the tool assembly. The second seal arrangement may include or define a downstream seal arrangement of the tool assembly.

In use, on sealing the tool assembly to the pipe, the seal arrangements may provide an isolated annular volume or chamber between the clamp and the pipe.

The tool assembly may include an activation arrangement. The activation arrangement may be operatively associated with or form part of the clamp. The activation arrangement may be configured to activate the lock arrangement. The activation arrangement may be configured to actuate the seal arrangement. In particular embodiments, the activation arrangement may be configured to activate the lock arrangement and actuate the seal arrangement.

In use, the activation arrangement may be configured to transmit an axial force to the seal arrangement to compress the seal arrangement, the axial force being transmitted to the lock arrangement to activate the lock arrangement via the co-operating lock members.

In particular embodiments, the activation arrangement may include a mechanical activation arrangement. The activation arrangement may alternatively or additionally include a hydraulic activation arrangement, pneumatic activation arrangement or the like.

The activation arrangement may include an activation member, which in particular embodiments may include a compression flange.

The activation arrangement may be axially split to facilitate assembly onto the pipe. In particular embodiments, the activation member may include two circumferentially arranged elements: a first element and a second element. The first and second elements may be configured to be coupled together to form the activation member.

A boss portion of the activation member may be configured to extend into an end of the clamp, the boss portion radially interposed between the inside of the clamp and the outside of the pipe. A flange portion of the activation member may be configured to extend over the end of the clamp.

A coupling may be provided between the activation member and the clamp, in particular but not exclusively between the flange portion and the clamp. The coupling may facilitate axial movement of the activation member relative to the clamp on rotation of the activation member to activate the lock arrangement and/or actuate the seal arrangement. The coupling may include a threaded connector, or other suitable connector. It will be recognized that the coupling of the activation member may be axially split, a portion of the coupling or thread being disposed on each of the first element and the second element. By virtue of the secure coupling between the first and second sleeve portions, the coupling portions may be accurately aligned so as to define a continuous coupling.

In use, the activation member may be disposed around the pipe and rotated to apply an axial force on the seal element to compress the seal element and apply an axial force on the lock arrangement to urge the lock member or members into engagement with the pipe.

The activation arrangement may includes a first activation arrangement operatively associated with the first lock arrangement and first seal arrangement and a second activation arrangement operatively associated with the second lock arrangement and/or the second seal arrangement.

As outlined above, the tool assembly includes a cutting tool operatively associated with the clamp. At least part of the cutting tool may be disposed within a cutting tool housing. In particular embodiments, the cutting tool housing may include a pressure competent housing, so that fluid, such as gas, cannot escape from the pipe when the pipe is cut.

The cutting tool housing may be coupled to the clamp. A seal member, such as an o-ring seal may be provided to seal the connection between the cutting tool housing and the clamp. In other embodiments, the cutting tool housing may be integrally formed with the clamp, for example but not exclusively with the first sleeve portion of the clamp. The cutting tool housing may be disposed perpendicular or substantially perpendicular to the clamp. In a first configuration, the cutting tool may be configured so a cutter of the cutting tool is in a retracted position relative to the pipe, the cutter being movable from the retracted position to an extended position to engage the pipe.

The cutting tool may be of any suitable form and construction. The cutting tool may include a hole cutting tool, in particular but not exclusively a hollow milling cutter, hot tap cutting tool or the like. The cutting tool may include a pilot drill. However, in particular embodiments the cutting tool may not require a pilot drill.

The cutting tool may be configured to create a hole having a diameter equal to or greater than the diameter of the pipe, to as to sever the pipe. In some embodiments, the cutting tool may include a manual cutting tool, such as a crank.

As outlined above, the tool assembly includes an isolation tool operatively associated with the clamp. The isolation tool may be of any suitable form and construction. The isolation tool may include a housing. In particular embodiments, the isolation tool housing may include a pressure competent housing, such that fluid, such as gas, cannot escape from the pipe. The isolation tool housing may be coupled to the clamp. A seal member, such as an o-ring seal, may be provided to seal the connection between the isolation tool housing and the clamp. In other embodiments, the isolation tool housing may be integrally formed with the clamp, for example but not exclusively with the second sleeve portion of the clamp. The isolation tool housing may be disposed perpendicular or substantially perpendicular to the clamp. In use, the pipe may be severed and the isolation tool installed between the first pipe section and the second pipe section. In particular embodiments, the isolation tool may be positioned so that the tool spans the pipe bore and the pipe walls so that the tool provides at least two contact surfaces with the pipe for resisting and/or transferring fluid pressure forces exerted on the tool from fluid in the pipe. Beneficially, embodiments of the present invention facilitate isolation to be achieved in small bore pipework that lacks incumbent isolation and/or where there is no access into the system from an end of the pipe to install traditional isolation devices.

The isolation tool may include a spigot, the spigot moveable between a first retracted position and a second position where the seal element of the isolation tool straddles the pipe.

The seal element of the isolation tool may be of any suitable form and construction. In particular embodiments, the seal element may include a compliant seal. The provision of a compliant seal permits the seal to deform and fill the bore of the pipe.

The tool may be adapted to be driven into the pipe or to the desired location between the pipe sections by any suitable means. In particular embodiments, the tool may be driven by mechanical means such as a bolt or threaded connection. However, it will be recognized that the isolation tool may alternatively be driven by pneumatically, hydraulically or by other suitable means.

The tool assembly may include, or may be operatively associated with or provided in combination with, a second isolation tool. The second isolation tool may be configured for axial deployment into or through the pipe. The second isolation tool may be configured to provide a secondary isolation downstream of the first isolation provided by the isolation tool of the tool assembly. In use, following cutting of the pipe and insertion of the isolation tool, location of the second isolation tool may provide a secondary isolation, permitting the clamp, the cutting tool and the isolation tool to be removed.

The tool assembly may include, or may be provided in combination with, a pipe fitting or pipe connector. In particular embodiments, the pipe fitting may include a compression fitting or other suitable fitting. However, other suitable fittings may be provided.

In particular embodiments, the second isolation tool may be disposed within the pipe fitting or pipe connector. For example, the second isolation tool may be initially disposed within the pipe fitting or pipe connector and then deployed further into the pipe.

The tool assembly may include, or may be provided in combination with, one or more of a further pipe fitting, a valve or other pipe section.

The further pipe fitting may include a compression fitting or other suitable fitting. The valve may include a ported valve.

According to a second aspect of the present invention there is provided a method including: providing a tool assembly including a clamp configured for location about a pipe, a cutting tool operatively associated with the clamp, and an isolation tool operatively associated with the clamp, activating the clamp to secure the tool assembly to the pipe, activating the cutting tool to sever the pipe into a first pipe section and a second pipe section, and deploying the isolation tool between the first pipe section and the second pipe section such that a seal element of the isolation tool isolate a section of the pipe.

Beneficially, in embodiments of the present invention once the pipe is severed the isolation tool is deployed perpendicular or substantially perpendicular to the cut section of pipe and the pipe is held by the clamp while maintaining the original pressure envelope. The perpendicular or substantially perpendicular deployed seal may be compressed axially, causing radial expansion. This seal seals on both the upstream and downstream ends of the pipe sections, allowing the clamp pressure to be vented and the integrity of the isolation verified. Once the pipeline is severed, a pipe fitting, such as a compression fitting or other suitable fitting, may be installed using an axially deployed second isolation tool such as described above sealing on the inside diameter of the pipe fitting. Beneficially, the second isolation tool may form a new pressure envelope which allows the first isolation tool to be removed. The second isolation tool may then be extended past the clamp and set in the new location. This creates a new pressure envelop upstream of the clamp assembly. The tool assembly may then be removed. A further pipe fitting, for example but not exclusively a further compression fitting and/or a valve, such as a full port valve complete with section of pipe or tubing, may then be installed. The valve can be closed and the invention removed leaving a standard inline valve connection and bare length of pipe.

It will be recognized that embodiments of the present invention provide a number of advantages. For example, embodiments of the present invention permit isolation of, and intervention into a live pipeline with compact tooling, with the ability to remove all non-permanent fittings once operations have been completed, leaving the pipe in a fully code compliant condition. The ability to remove the clamp not only assists in the pipe code compliance, it also makes the whole system re-usable with the significant commercial advantage of not having to replace the encasement clamp each operation. Using a single tool assembly eliminates or at least mitigates risk associated with changing out tooling packages on a live system. In removing the tooling change out, a valve that would otherwise be required may be omitted, reducing weight. Moreover, removing the tooling change out removes transient leak paths, reducing risk and simplifying operation. The provision of a pressure contained cutting tool permits the pipe to be severed without compromising the pressure envelope of the pipe. The use of a separate cutting tool permits isolation of heavier wall pipe, as compared to systems having a cutting tool cutter disposed on the nose of the seal carrier.

It should be understood that the features defined above in accordance with any aspect of the present invention or below in accordance with any specific embodiment may be utilized, either alone or in combination with any other defined feature, in any other aspect of the invention.

BRIEF DESCRIPTION OF THE DRAWINGS

These and other aspects of the present invention will now be described, by way of example only, with reference to the accompanying drawings, in which.

DETAILED DESCRIPTION OF THE DRAWINGS

Figure 1:
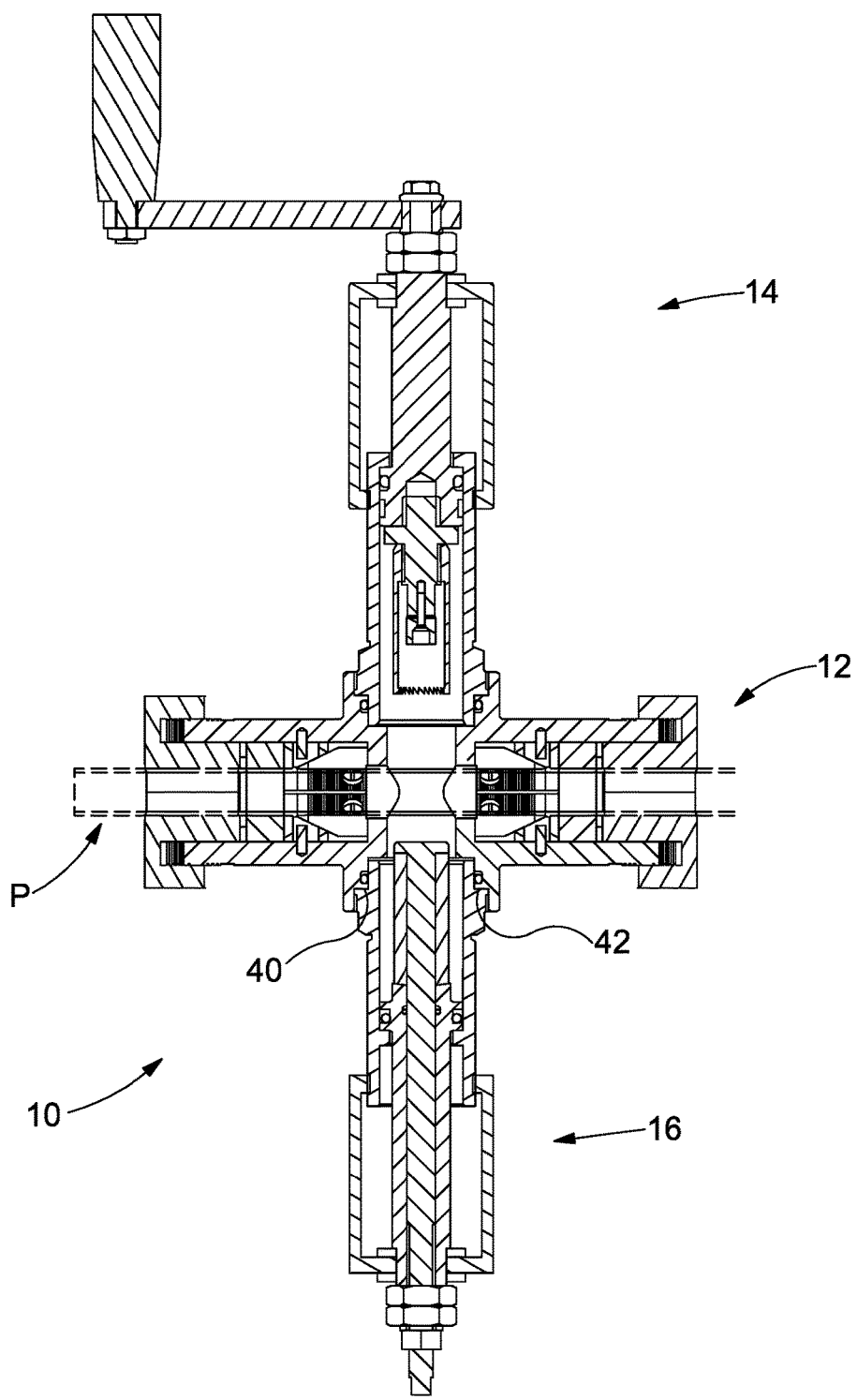
FIG. 1 shows a cross-sectional view of a tool assembly according an embodiment of the present invention.

Referring first to FIG. 1 of the accompanying drawings, there is shown a tool assembly 10 according to an embodiment of the present invention. The tool assembly 10 is configured for location on a section of a pipe P (shown in dotted line in FIG. 1) and is operable to both isolate a section of the pipe P and perform an intervention into the pipe P while maintaining pressure integrity.

As shown in FIG. 1, the tool assembly 10 includes a clamp 12, a cutting tool 14 and an isolation tool 16. As will be described further below, in use, the clamp 12 sealingly secures the tool assembly 10 to the pipe P, the cutting tool 14 performing an intervention operation on the pipe P, and the isolation tool 16 isolating the section of pipe P in order that repair or replacement of equipment can be effected.

Figure 2:
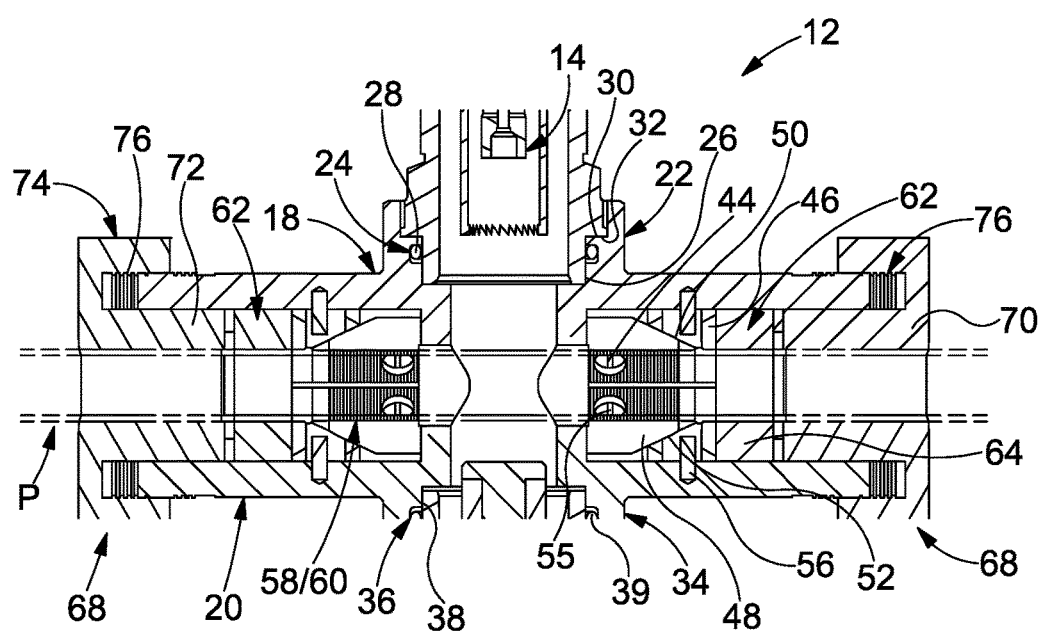
FIG. 2 shows an enlarged view of the clamp of the tool assembly shown in FIG. 1.

FIG. 2 of the accompanying drawings shows an enlarged view of part of the tool assembly 10 shown in FIG. 1 and shows the clamp 12 of the tool assembly 10 in more detail. As shown in FIG. 2, in the illustrated embodiment the clamp 12 takes the form of a split sleeve clamp having a first sleeve portion 18 and a second sleeve portion 20 detachably secured together by means of bolts 21 (see FIG. 6).

The first sleeve portion 18 is generally hemi-cylindrical in construction having a radially extending boss portion 22 for coupling to the cutting tool 14. An annular groove 24 is formed in the inner surface 26 of the boss portion 22, and the groove 24 is arranged to receive a seal member in the form of an o-ring seal 28. The inner surface 26 of the boss portion 22 also defines a shoulder 30 for engaging a corresponding shoulder 32 of the cutting tool 14.

The second sleeve portion 20 is also generally hemi-cylindrical in construction and has a radially extending boss portion 34 for coupling to the isolation tool 16. As in the first sleeve portion 18, an annular groove 36 is formed in the inner surface 38 of the boss portion 24 of the second sleeve portion 20, and the groove 36 is arranged to receive a seal member in the form of an o-ring seal 39. The inner surface 38 of the boss portion 34 of the second sleeve portion 20 also defines a shoulder 40 for engaging a corresponding shoulder 42 of the isolation tool 16.

A lock arrangement 44 is provided for securing the tool assembly 10 to the pipe P. In the illustrated embodiment, the lock arrangement 44 includes a taper lock having a first lock member in the form of lock bowl 46 and a second lock member defining a plurality of circumferentially arranged lock segments 48. A tapered inner surface 50 of the lock bowl 46 is configured to co-operate with a tapered outer surface 52 of each of the lock segments 48 to urge the lock segments 48 radially inwards into engagement with the pipe P to secure the tool assembly 10 to the pipe P. In the illustrated embodiment, the lock bowl 46 includes a plurality of separate elements or segments 54. The lock segments 54 of the lock bowl 46 have a slot and pin restraint 55 which allows sufficient axial movement to set the lock arrangement 44, while preventing them from disengaging with the lock arrangement 44 releasing. The lock segments 48 are retained in place with radial screws 56. Beneficially, the coupling permits sufficient movement for the lock arrangement 44 to engage the pipe P but prevent the lock arrangement 44 from becoming detached when the clamp 12 is released. To assist in securely engaging the pipe P, an inner surface 58 of each lock segment 48 has a tooth profile 60 to facilitate gripping of the pipe P, in use. Beneficially, the provision of the slot and pin restraint 55 and radial screws 56 facilitates accurate and secure activation of the lock arrangement 44, in particular in frequent-use clamp applications as opposed to traditional designs having single acting restraints which may release the lock upon activation.

As shown in FIG. 2, the tool assembly 10 includes two lock arrangements 44, one at each end of the clamp 12. In use, the lock arrangements 44 retain the ends of the pipe P when the pipe P is severed in the cutting operation (described further below), even on a high pressure system.

A seal arrangement 62 is provided for sealing between the tool assembly 10 and the pipe P. In the illustrated embodiment, the seal arrangement 62 includes an elastomeric compression seal element 64 interposed between the clamp 12 and the pipe P. In use, axial force transmitted to the seal element 64 axially compresses and radially expand the seal element 64 into engagement with the pipe P.

As shown in FIG. 2, the tool assembly 10 includes two seal arrangements 62, one at each end of the clamp 12. In use, on sealing the tool assembly 10 to the pipe P, the seal arrangements 62 provide an isolated annular volume or chamber 66 between the clamp 12 and the pipe P.

The tool assembly 10 further includes an activation arrangement 68 for activating the lock arrangement 44 and actuating the seal arrangement 62. In use, the activation arrangement 68 is configured to transmit an axial force to the seal arrangement 62 to compress the seal element 64, the axial force being transmitted to the lock arrangement 44 to activate the lock arrangement 44. In the illustrated embodiment, the activation arrangement 68 includes an actuation member in the form of axially split compression flange 70. The compression flange 70 includes a boss portion 72, and the boss portion 72 is radially interposed between the inside of the clamp 12 and the outside of the pipe P and configured to extend into an end of the clamp 12. The compression flange 70 further includes a flange portion 74 configured to extend over the end of the clamp 12.

A coupling may be provided between the flange portion 74 and the clamp 12, the coupling in the illustrated embodiment including a thread connection 76. The thread connection 76 facilitates axial movement of the compression flange 70 relative to the clamp 12 on rotation of the compression flange 70 to activate the lock arrangement 44 and actuate the seal arrangement 62. It will be recognized that the thread connection 76 of the compression flange 70 is axially split to facilitate location on the clamp 12. By virtue of the secure coupling between the first and second sleeve portions 18 and 20, the portions of the thread connection 76 are accurately aligned so as to define a continuous coupling.

As shown in FIG. 2, the tool assembly 10 includes two compression flanges 70, one at each end of the clamp 12.

Figure 3:
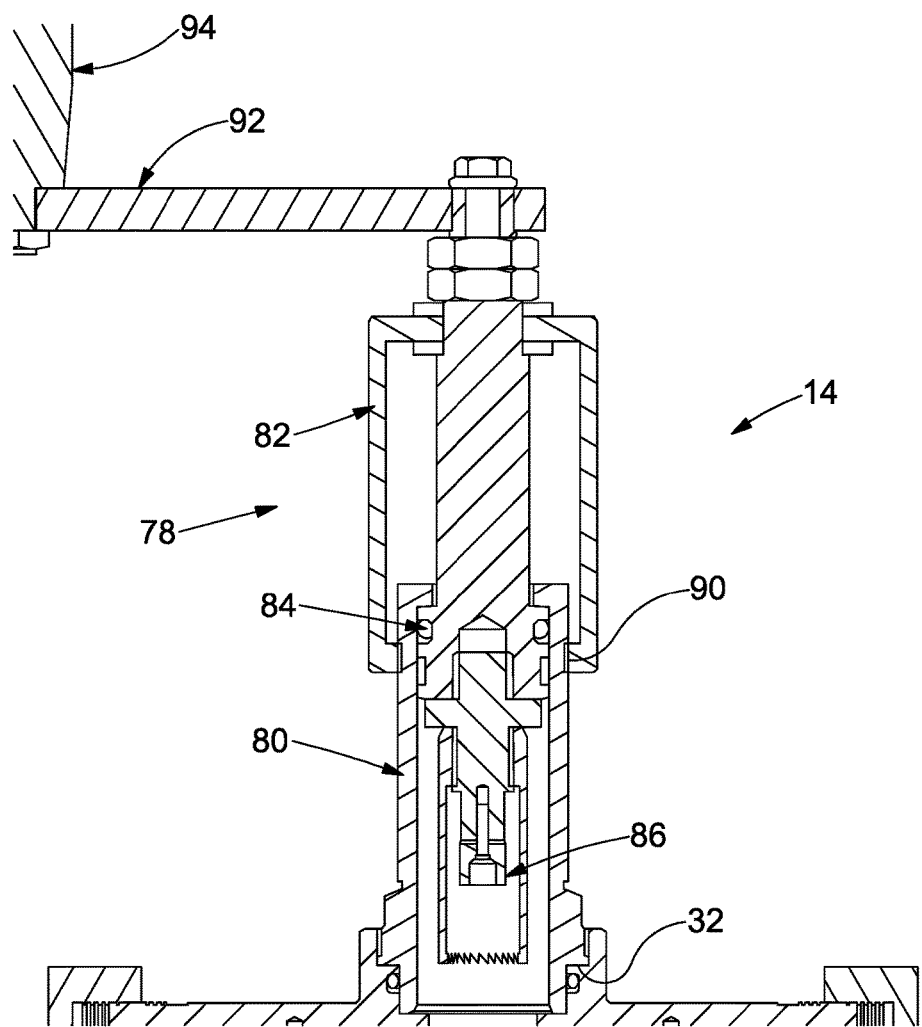
FIG. 3 shows an enlarged view of the cutting tool of the tool assembly shown in FIG. 1.

Referring now in particular to FIG. 3 of the accompanying drawings, there is shown an enlarged view of another part of the tool assembly 10, showing the cutting tool 14 in more detail.

As shown in FIG. 3, the cutting tool 14 includes a cutting tool housing 78 disposed perpendicularly to the clamp 12. The housing 78 includes an inner housing 80 and an outer housing 82. The cutting tool housing 78 is coupled to the clamp 12, and the shoulder 32 engages the shoulder 30 provided in the first sleeve portion 18. An o-ring seal 84 completes a pressure boundary with inner housing 80 so that fluid, such as gas, cannot escape from the pipe P when the pipe P is cut.

A cutter 86 is mounted on a spindle 88 sealingly disposed within the housing 78. As will be described further below, in a first configuration as shown in FIGS. 1 and 3, the cutting tool 14 is configured so the cutter 86 of the cutting tool 14 is in a retracted position relative to the pipe P, and the cutter 86 is movable from the retracted position to an extended position to engage the pipe P by rotating the outer housing 82 over a thread 90 on the inner housing 80.

The cutting tool 14 may take a number of different forms. However, in the illustrated embodiment the cutting tool 14 takes the form of a manually operable hole cutting tool, more specifically a hollow milling cutter, hot tap cutting tool or the like operated via crank 92 and handle 94.

Figure 4:
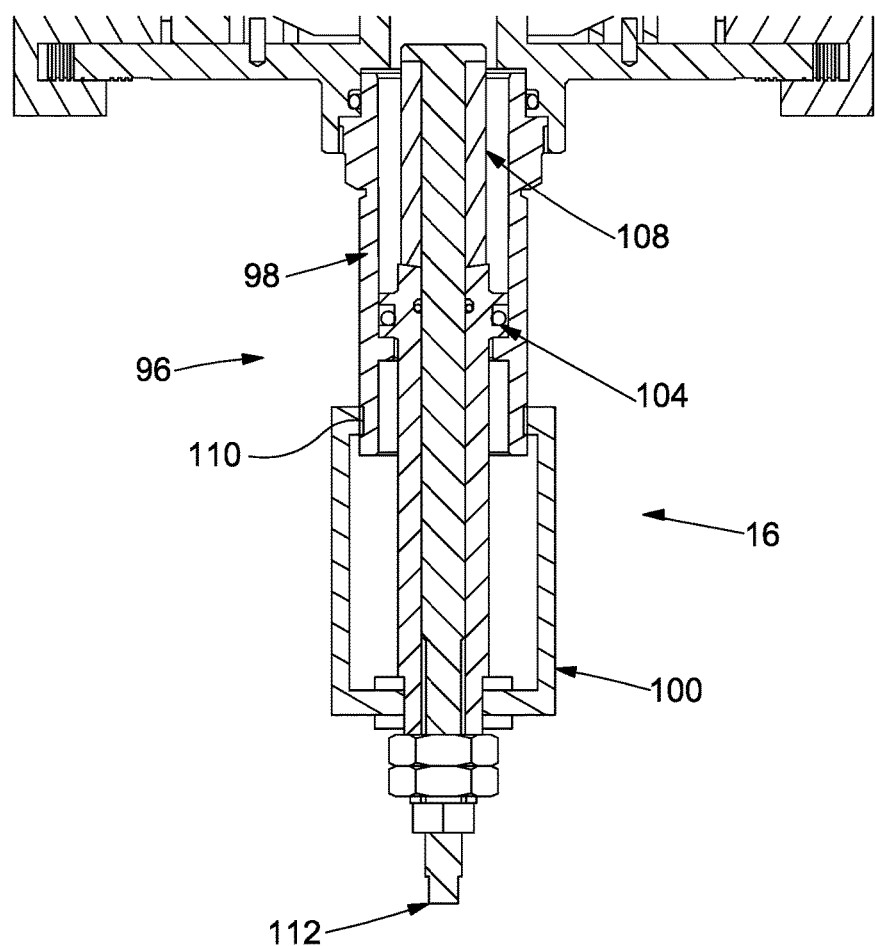
FIG. 4 shows an enlarged view of the isolation tool of the tool assembly shown in FIG. 1.

Referring now in particular to FIG. 4 of the accompanying drawings, there is shown an enlarged view of another part of the tool assembly 10, showing the isolation tool 16 in more detail.

As shown in FIG. 4, the isolation tool 16 includes an isolation tool housing 96 housing disposed perpendicularly to the clamp 12 and disposed on the opposite side of the clamp 12 from the cutting tool inner housing 80. The isolation tool housing 96 includes an inner housing 98 and an outer housing 100. As with the cutting tool housing 78, the isolation tool housing 96 is pressure competent when combined with o-ring seal 104 so that fluid, such as gas, cannot escape from the pipe P. The isolation tool housing 96 is coupled to the clamp 12, the shoulder 42 engaging shoulder 40 provided in the second sleeve portion 20.

The isolation tool 16 further includes a spigot 106 moveable between a first retracted position and a second position where a seal element 108 of the isolation tool 16 straddles the pipe P by rotating outer housing 100 over a thread 110 on the outside of inner housing 98. In the illustrated embodiment, the seal element 108 of the isolation tool 16 includes a compliant seal configured to deform and fill the bore of the pipe P.

In the illustrated embodiment, the seal 108 is adapted to be compressed axially by a bolt or threaded connection 112. However, it will be recognized that the isolation tool 16 may alternatively be activated by pneumatically, hydraulically or by other suitable means.

Figure 5:
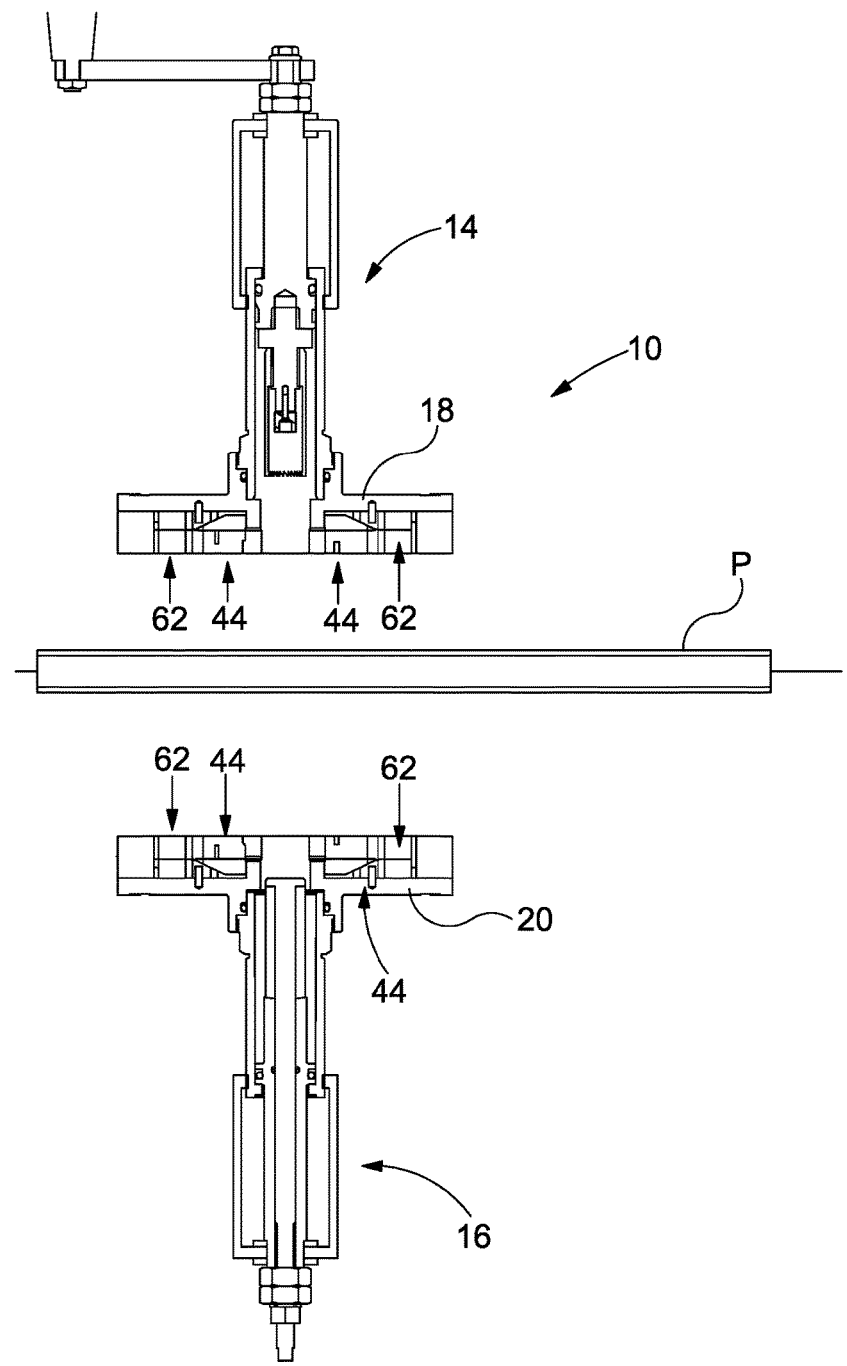
FIGS. 5 to 14 illustrate the operation and method of the tool assembly according to the present invention.
Figure 6:
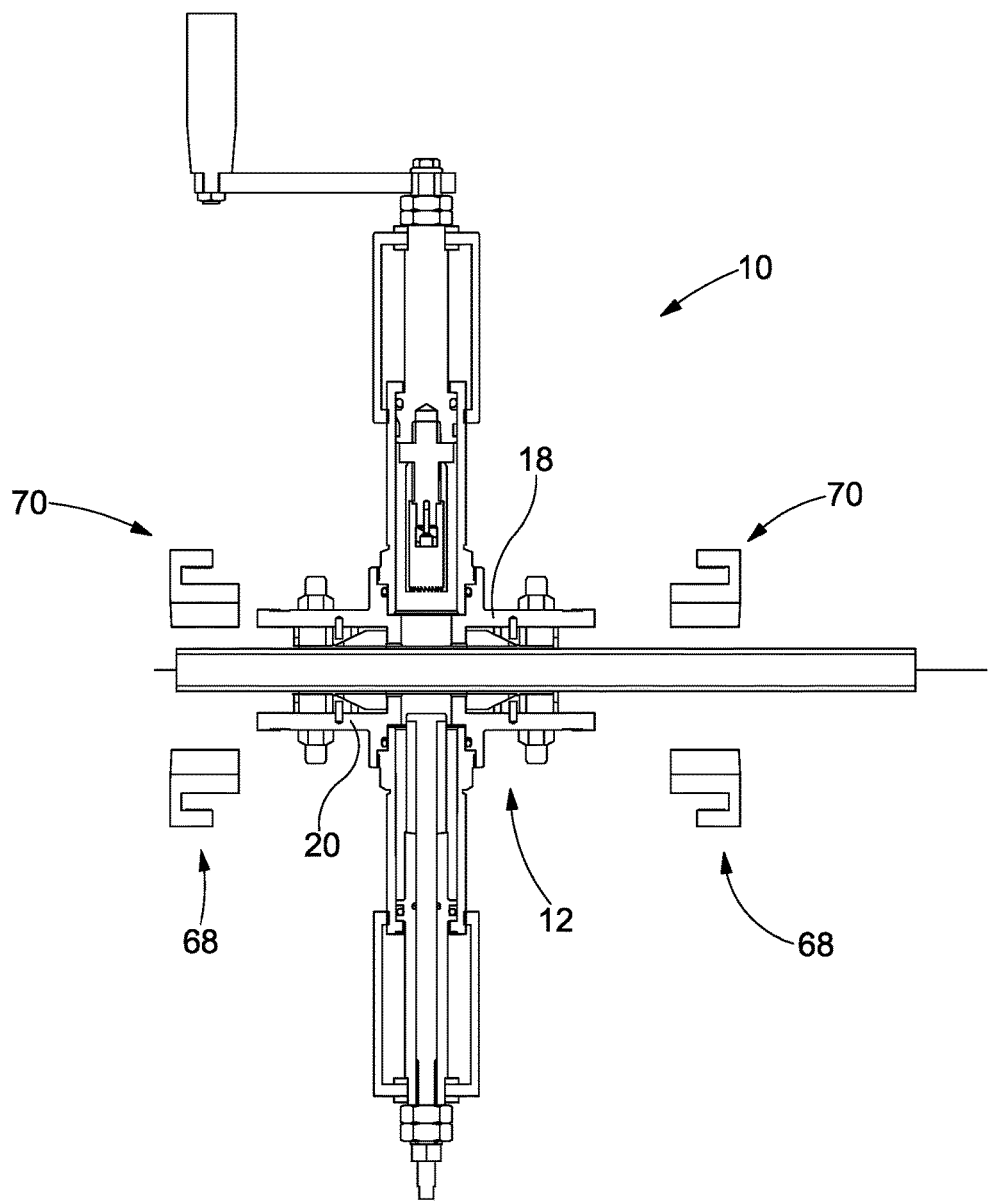
Figure 7:
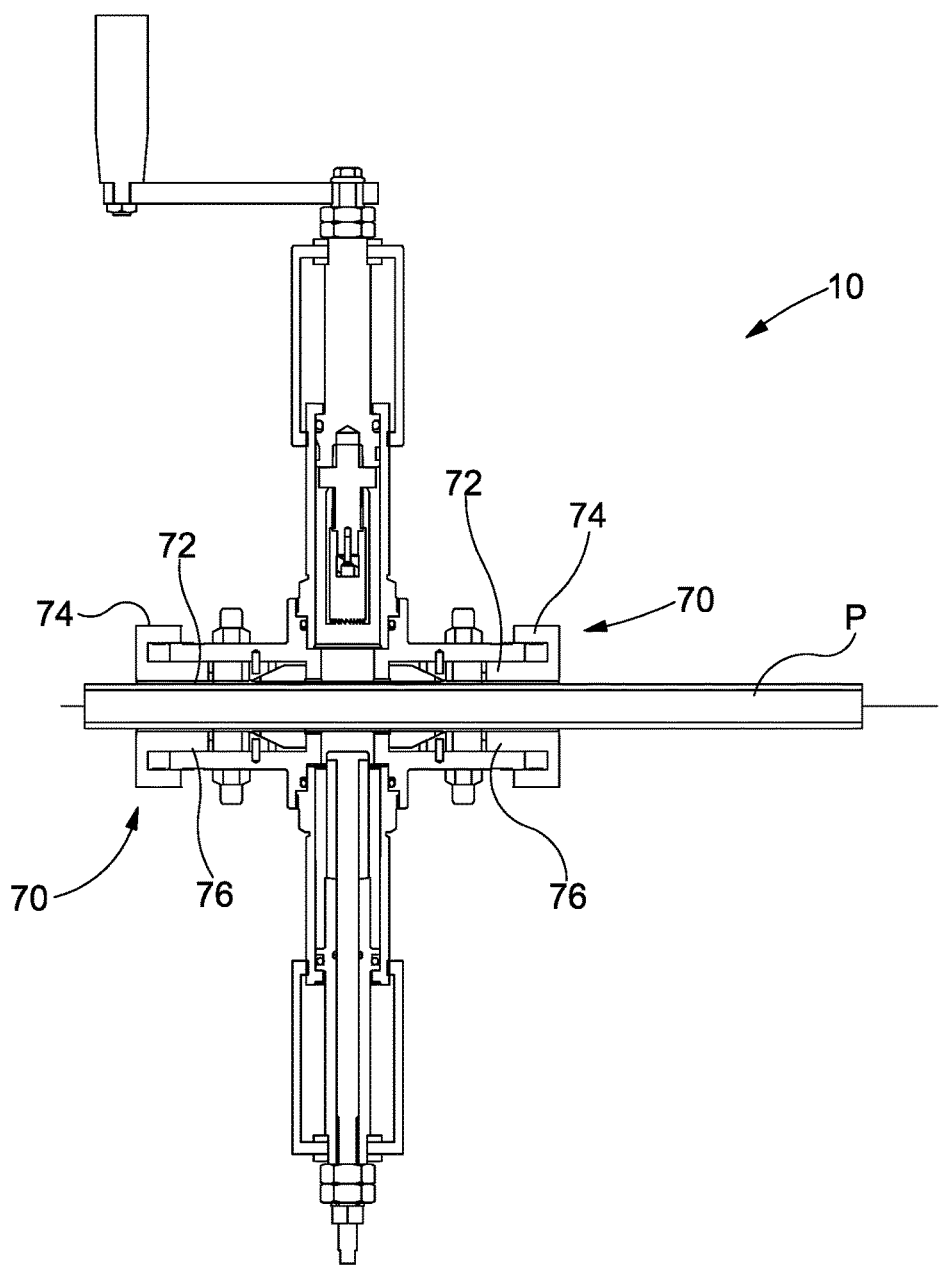

Assembly and operation of the tool assembly 10 will now be described with reference to FIGS. 5 to 14. FIGS. 5 to 7 illustrate how the tool 10 assembly is assembled and located on the pipe 10, while FIGS. 8 to 14 illustrate operation of the tool assembly 10 according to an embodiment of the invention.

FIG. 5 illustrates the tool assembly 10 prior to location on the pipe P. As shown in FIG. 5, the first sleeve portion 18 is coupled to the cutting tool 14 and disposed on a first side of the pipe P while the second sleeve portion 20 is coupled to isolation tool 16 and disposed on a second of the pipe P. The tool assembly 10 includes two lock arrangements 44, one lock arrangement 44 at each end of the clamp 12 and includes two seal arrangements 62, one seal arrangement 62 at each end of the clamp 12.

In use, the sleeve portions 18 and 20 are assembled around the pipe P at the desired isolation point and securely bolted together via the bolts 21, as shown in FIG. 6.

Referring now to FIG. 6 of the accompanying drawings, the compression flanges 70, which form the activation arrangement 68 for activating the lock arrangement 44 and actuating the seal arrangement 62 may be assembled to the clamp 12. As shown in FIG. 6, the tool assembly 10 includes two axially split compression flanges 70, one split flange 70 at each end of the clamp 12. While FIG. 6 shows each flange 70 separately, it will be recognized that each flange 70 may be pre-assembled with the respective split line corresponding to/mating with the split line of sleeve portions 18 and 20 prior to location on the clamp 12. As described above, axially splitting the compression flanges 70 facilitates assembly onto the pipe P, and the geometric design allows the thread connection 76, which is also cut axially, to couple the respective compression flange 70 to the clamp 12. Although the thread formed on the clamp 12 is also split axially, the clamp bolting 21 ensures the thread connection 76 remains intact.

In use, the compression flanges 70 are assembled and screwed onto the clamp 12, as shown in FIG. 7, and the boss portion 72 is radially interposed between the inside of the clamp 12 and the outside of the pipe P and configured to extend into an end of the clamp 12 while the flange portion 74 is configured to extend over the end of the clamp 12. It will be recognized that the design of the boss portion 72 provides a tight fitting sleeve which fits snugly inside the clamp 12, acting as a compression sleeve to apply axial load onto the seal and lock arrangements 62 and 44 and prevents the compression flange 70 from separating at the split line. As the compression flanges 70 in the illustrated embodiment are screwed on, the respective boss portions 72 are driven inside the clamp 12 and radially constraining the flange portions 74. As the flange portion 74 and the boss portion 72 are rigidly connected in a single machined component, this radial constraint also acts on the boss portion 72, and the thread connection 76 between the clamp 12 and the boss portion 72 is designed to offer greater radial interference than the clearance of the boss portion 72 to the bore of the clamp 12. The thread connection 76 drives the boss portion 72 into the guided bore, and the boss portion 72 in turn maintains the thread engagement. Beneficially, embodiments of the present invention provide for a single screw action to compress the seal and lock arrangements 62 and 44 as opposed to a radial array of multiple bolts to engage the compression flange 70 as may otherwise be required, although such an arrangement may be used in some embodiments.

Once assembled on the clamp 12, rotation of the compression flanges 70 transmits an axial force to the seal arrangement 62 to compress the seal element 64, the axial force being transmitted to the lock arrangement 44 to activate the lock arrangement 44. The lock arrangement 44, which in the illustrated embodiment include a taper lock assembly, securely prevents any axial movement of the pipe P when the pipe P is cut while the seal arrangement 62, which in the illustrated embodiment includes elastomeric compression seal elements 64, provides a high integrity seal to prevent leakage from the clamp 12 when the pipe P is breached.

As described above, the lock arrangement 44 includes a plurality of lock segments 48 which move radially inwards as the compression flange 70 is actuated, these lock segments 48 having a tooth profile 60 which robustly grips the pipe P. The seal arrangement 62 provides a wide seal and controlled seal pressure making it highly compliant to poor pipe surface condition. The sleeve portions 18 and 20 also have elastomeric seals (not shown) along the split line which interface with the compression seal elements 64 generating a pressure competent boundary, which boundary can be pressure tested using a test port (not shown) on the clamp 12 prior to breaching the pipe integrity.

Operation of the tool assembly 10 will now be described with reference to FIGS. 8 to 14.

Figure 8:
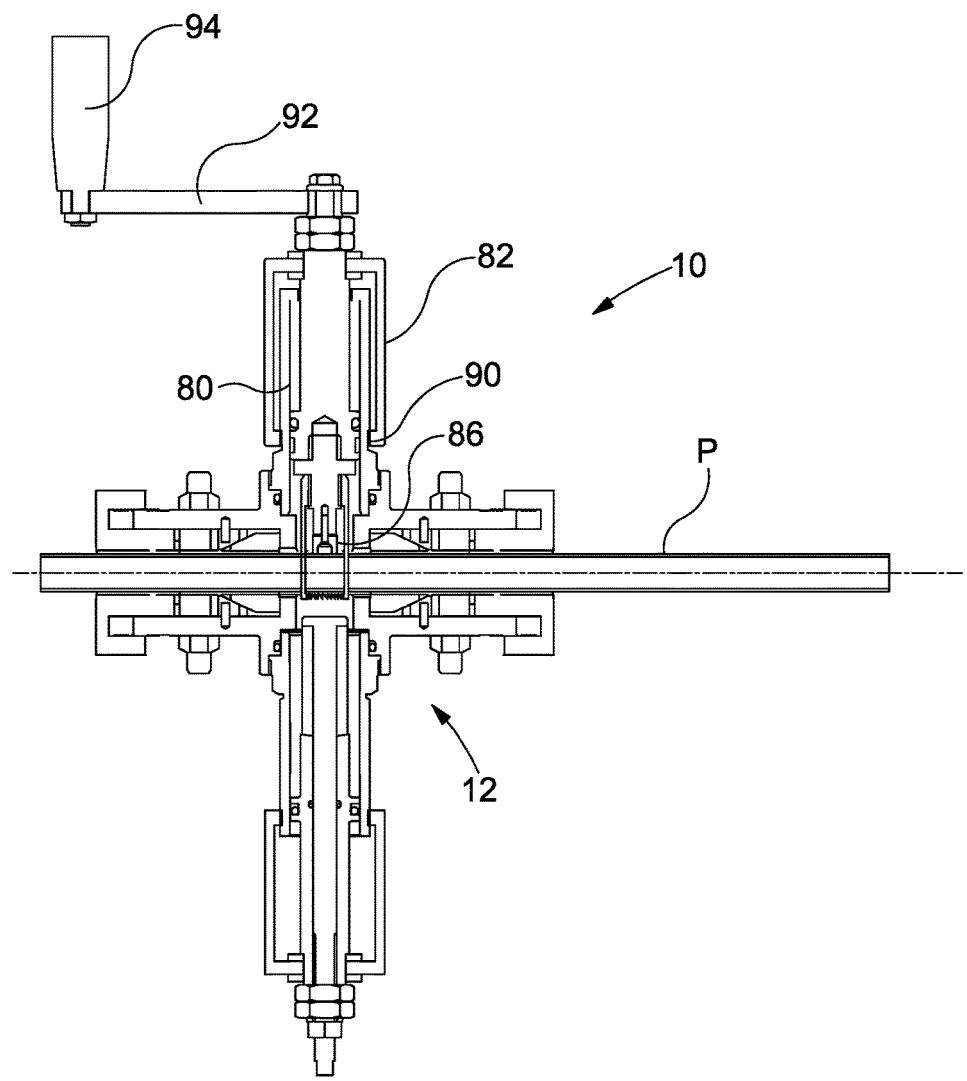

Once the clamp 12 is assembled and the integrity verified, the pipe P can be safely cut and FIG. 8 of the accompanying drawings shows the cutting tool 14 with the cutter 86 moved from retracted position relative to the pipe P shown in FIG. 7 to an extended position engaging the pipe P to facilitate the pipe cut. In the illustrated embodiment, the cutter 86 is movable from the retracted position to the extended position by rotating the handle 94 and crank 92 so that outer housing 82 rotates and translates over the thread 90 on the inner housing 80. Once complete, the severed pipe spool inside the cutter 86 is removed with the cutter 86.

Figure 9:
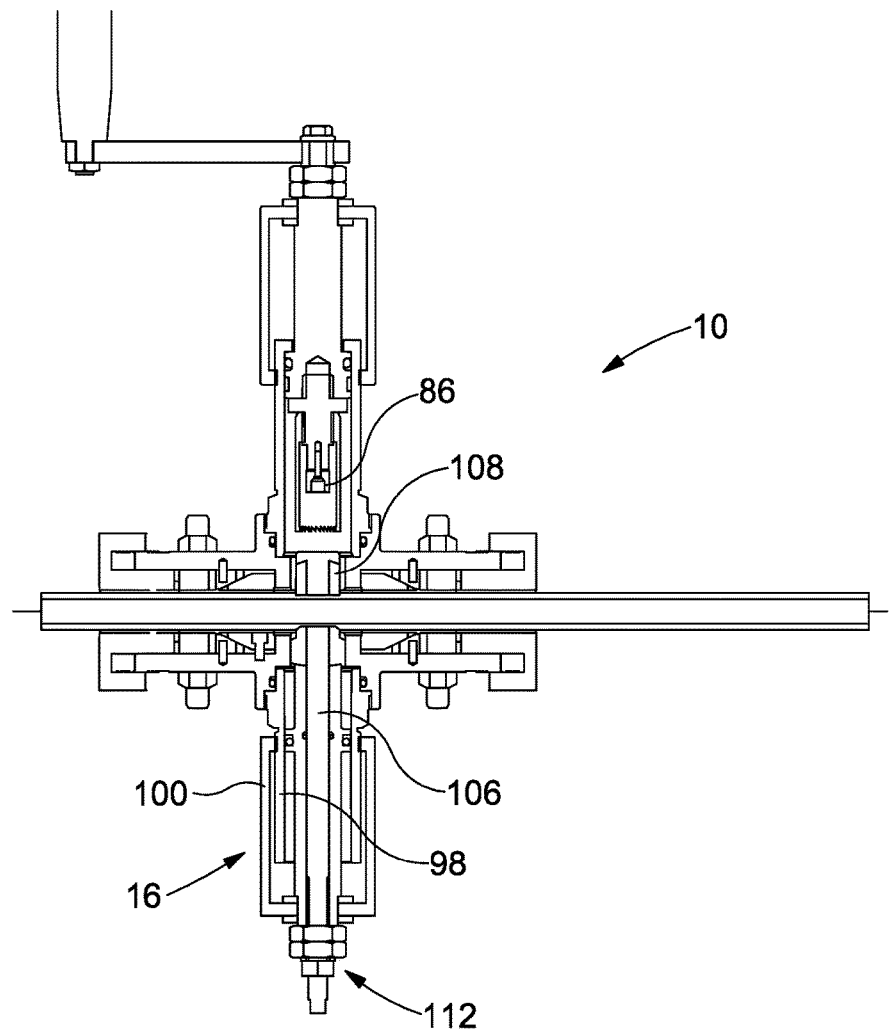

Referring now to FIG. 9 of the accompanying drawings, following removal of the cutter 86, the isolation tool 16 is deployed by rotating outer housing 100 over the thread 110 on the outside of inner housing 98 to move the spigot 106 from the first retracted position shown in FIG. 8 to the position shown in FIG. 9.

Figure 10:
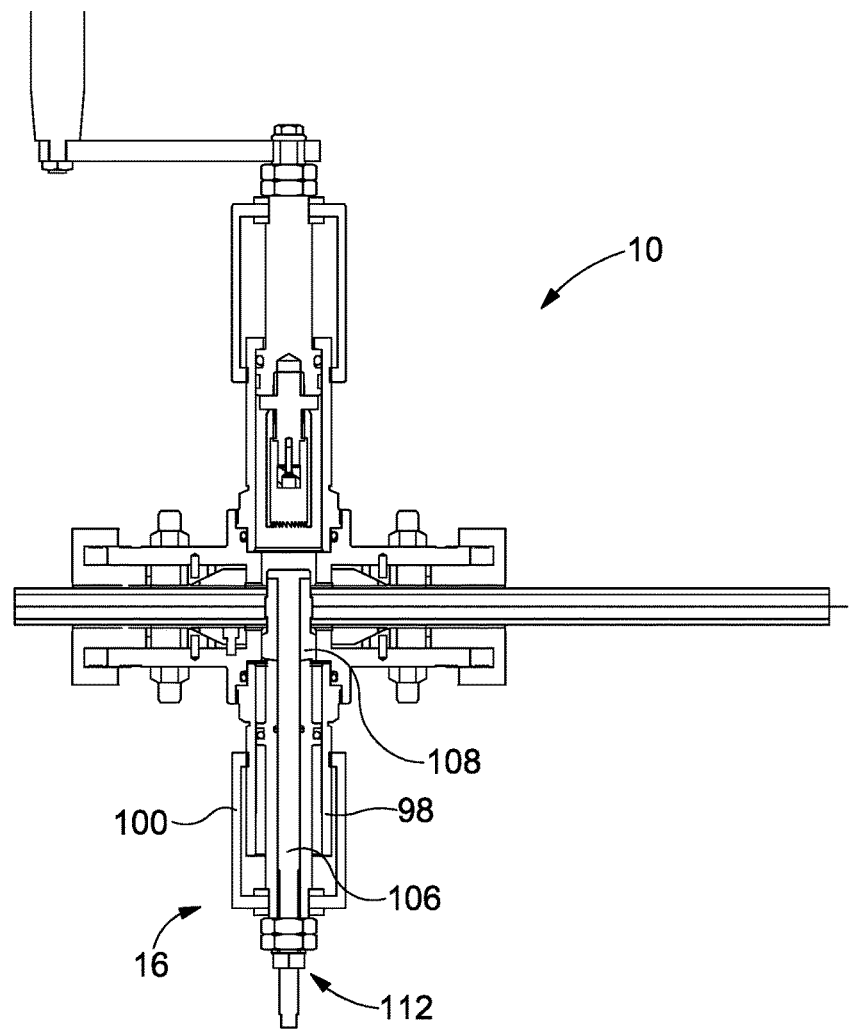

Once the seal element 108 is deployed to fully straddle the severed pipe P, and as illustrated in FIG. 10 of the accompanying drawings, the spigot 106 is moved via bolt or threaded connection 112 relative to housing 96 to axially compress and radially expand the seal element 108 in engagement with the ends of the pipe P. The seal element 108 is adapted to be compressed axially by a bolt or threaded connection 112. This compressive contact is sufficient to seal both pipe ends allowing the clamp cavity to be vented and the seal integrity of the isolation tool 16 to be verified.

Figure 11:
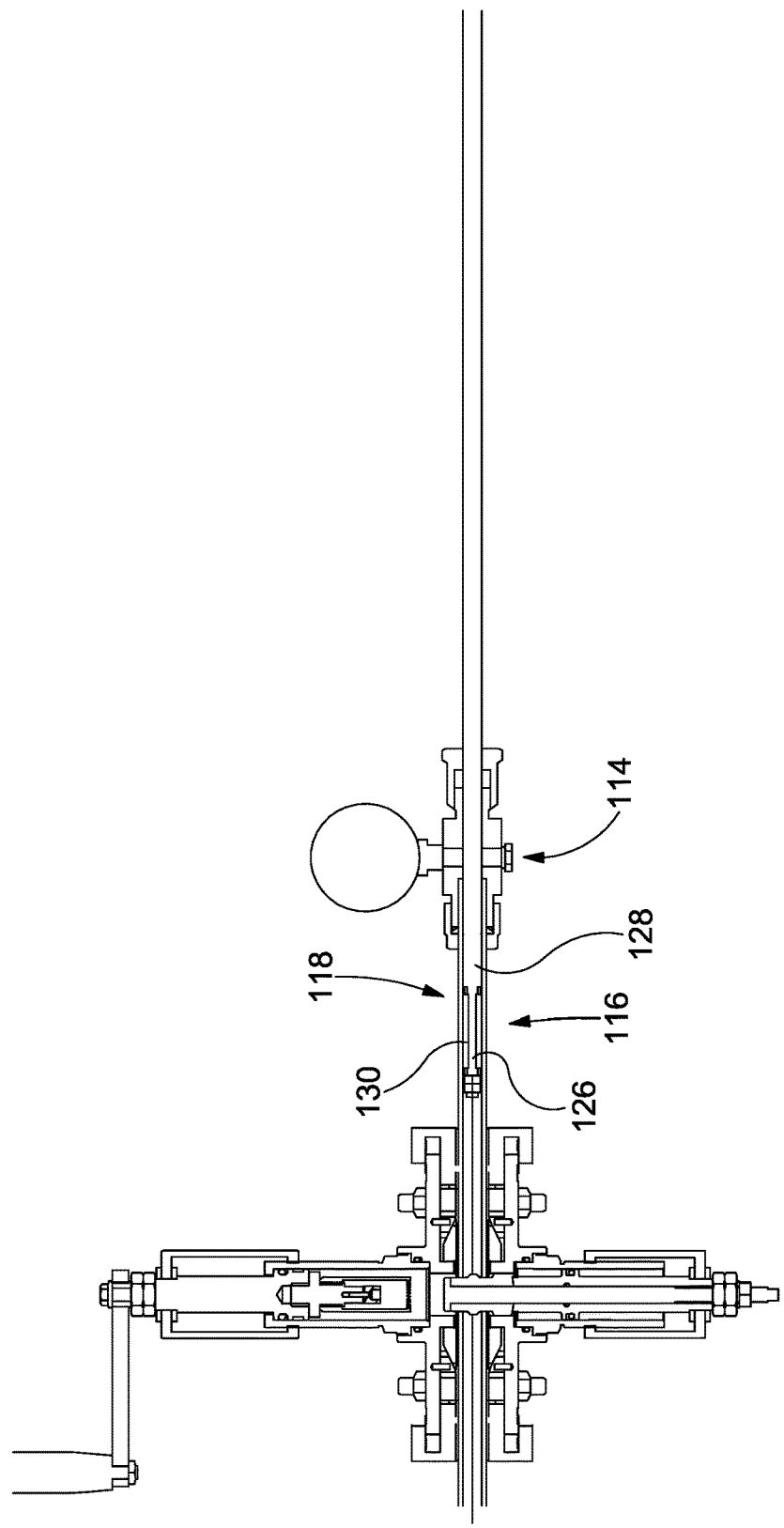
Figure 12:
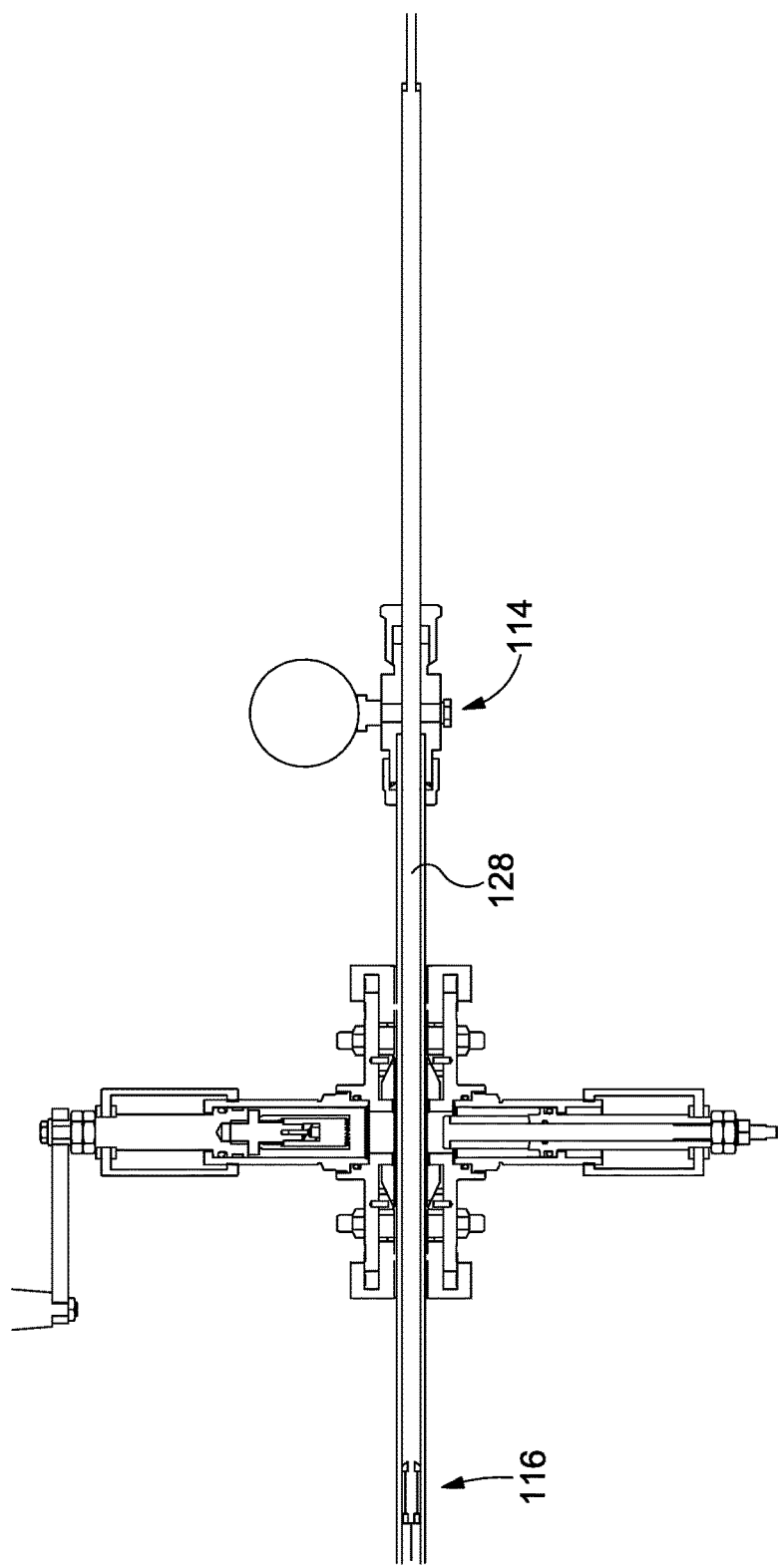

Referring now to FIGS. 11 and 12 of the accompanying drawings, once the seal provided by seal element 108 is verified, the downstream pipe section can be vented and the damaged section removed. The lock arrangement 44 will ensure the pipe ends do not move as the seal contact load is applied. The ability to increase the seal pressure independent of the axial movement with the shaft adjustment offers greater flexibility in the operation of the tool assembly 10.

The locks in the clamp 12 securely retain the ends of the pipe P so providing a secure reaction pad for the seal interface. As outlined above, once the pipe P is severed and a section has been removed, a pipe fitting 114, such as a compression fitting or other suitable fitting, may be installed using an axially deployed second isolation tool 116 sealing on the inside diameter of the pipe fitting 114. In the illustrated embodiment, the second isolation tool 116 is axially deployed via a launcher 118 that includes a spool 120 with a standard swage connector 122 at one end to suit the pipe P being maintained and a small compression seal 124 which provides an axial-movement-compliant seal against the outer diameter of the second isolation tool 116. Additional ports on the launcher 118 allow for pressure testing and venting of the isolated pipe P.

In the illustrated embodiment, the second isolation tool 116 is of similar construction to the isolation tool 16 in that it has a shaft 126 and sleeve 128, and relative movement of the shaft 126 and sleeve 128 compresses a tubular compression seal 130. In the second isolation tool 116, the seal 130 expands radially to contact the pipe P and generates sealing and sufficient friction to prevent movement. While the illustrated embodiment shows a single seal, a plurality of seals could alternatively be mounted in series to increase the friction. Once in place and set, the pressure downstream of the second isolation tool 116 can be vented and tested to verify the isolation integrity. Once the integrity of the seal 130 is verified, the clamp 12 can be removed and the pipe P cut upstream of the hot tap penetrations provided by the cutting tool 14.

Figure 13:
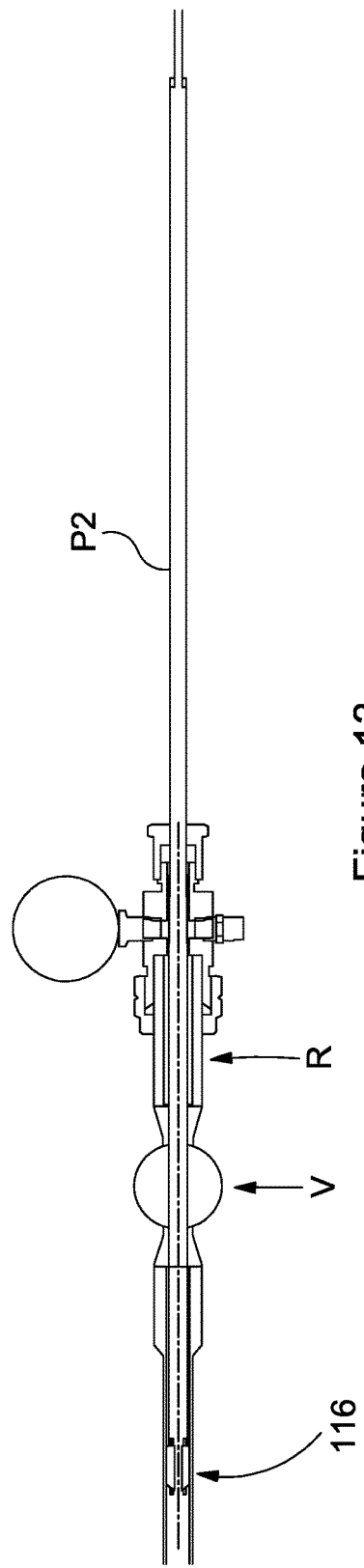
Figure 14:
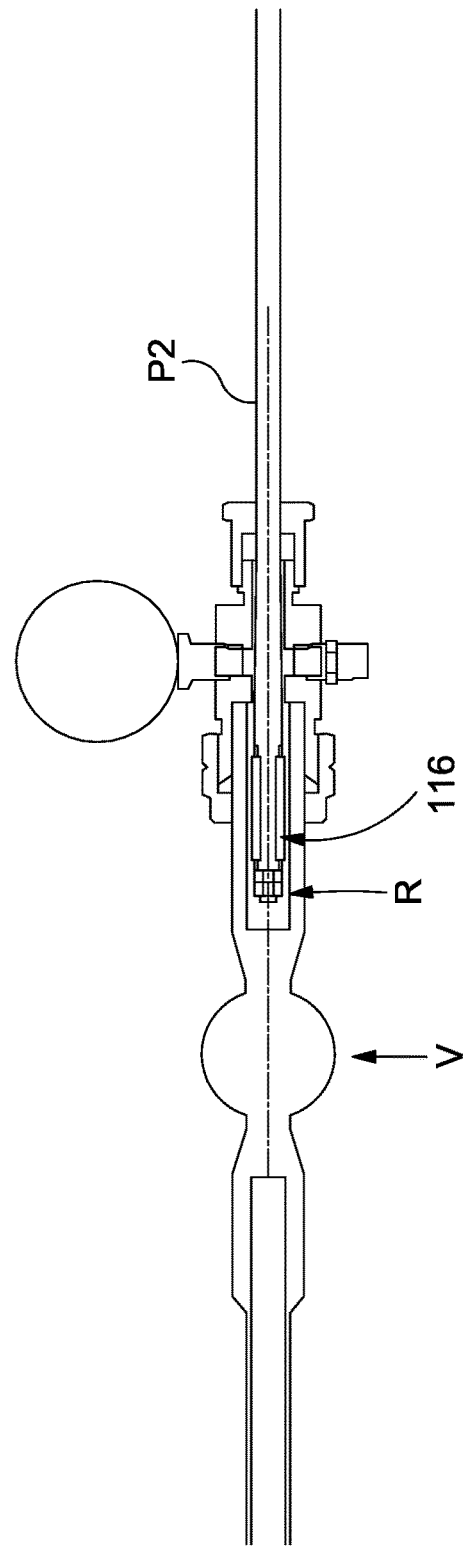

Referring now to FIGS. 13 and 14 of the accompanying drawings, a new pipe P2 and a valve V can be connected using any suitable permanent means, for example a compliant swage fitting. It will be recognized that the valve V will need to be full bore to fit over the second isolation tool 116. As shown in FIG. 13, a receiver R for the second isolation tool 116 is connected to the downstream side of the valve V to facilitate the safe removal of the second isolation tool 116, the second isolation tool 116 having a boss at the seal 130 which provides an interference fit with the receiver R to prevent accidental removal. Once the valve V is closed (as shown in FIG. 14), the second isolation tool 116 can be removed and the repaired pipe P reinstated.

It should be understood that the embodiment described herein is merely exemplary and that various modifications may be made thereto without departing from the scope of the invention. For example, in addition to or an alternative to use in gas distribution, embodiments of the invention may be used for toxic fluid transport and/or water supply and distribution.

Although a preferred embodiment of this invention has been disclosed, a worker of ordinary skill in this art would recognize that certain modifications would come within the scope of this invention. For that reason, the following claims should be studied to determine the true scope and content of this invention.

The invention claimed is:

1. A tool assembly for use in the isolation of, and intervention into, a pipe, the tool assembly comprising:
   a clamp configured for location about a pipe;
   a lock arrangement for securing the tool assembly to the pipe, wherein the lock arrangement is configured for location within the clamp such that the lock arrangement is interposed between an inner surface of the clamp and an outer surface of the pipe on location of the clamp about the pipe, wherein the lock arrangement comprises a taper lock comprising a first lock member and a second lock member, and a tapered inner surface of the first lock member is configured to co-operate with a tapered outer surface of the second lock member to urge the second lock member into engagement with the pipe to secure the tool assembly to the pipe, wherein at least one of:

the first lock member comprises a plurality of separate elements or segments, and the first lock member elements or segments are coupled together by a first lock member coupling, wherein the plurality of separate elements or segments are a slot and pin restraint, or the second lock member comprises a plurality of lock elements or segments, and second lock member is coupled to the clamp by a second lock member coupling, wherein the plurality of separate elements or segments are a radial screw;

a seal arrangement for sealing between the tool assembly and the pipe, wherein the seal arrangement is configured for location within the clamp such that the seal arrangement is interposed between the inner surface of the clamp and the outer surface of the pipe on location of the clamp about the pipe;

an activation arrangement configured to activate the lock arrangement and actuate the seal arrangement, wherein the activation arrangement comprises an activation member, and wherein the seal arrangement is located between the lock arrangement and the activation member;

a cutting tool operatively associated with the clamp, the cutting tool configured to sever the pipe into a first pipe section and a second pipe section; and an isolation tool operatively associated with the clamp, the isolation tool comprising a seal element configured for location between the first pipe section and the second pipe section to isolate a section of the pipe.

2. The tool assembly of claim 1, wherein the clamp comprises a split sleeve clamp.

3. The tool assembly of claim 1, comprising a first lock arrangement and a second lock arrangement, wherein the first lock arrangement defines an upstream lock of the tool assembly and the second lock arrangement defines a downstream lock of the tool assembly.

4. The tool assembly of claim 1, wherein a seal element of the seal arrangement comprises a compression seal element, and an axial force transmitted to the seal element axially compresses and radially expands the seal element into engagement with the pipe.

5. The tool assembly of claim 1, wherein the tool assembly comprises a first seal arrangement and a second seal arrangement, the first seal arrangement defining an upstream seal arrangement of the tool assembly and the second seal arrangement defining a downstream seal arrangement of the tool assembly, and the first and second seal arrangements are arranged to provide an isolated annular volume or chamber between the clamp and the pipe when the first and second seal arrangements are actuated.

6. The tool assembly of claim 1, wherein the activation arrangement is configured for rotation relative to the clamp, and rotation of the activation arrangement applying an axial force on the seal element to compress the seal element and apply an axial force on the lock arrangement to urge the lock arrangement into engagement with the pipe.

7. The tool assembly of claim 1, wherein a boss portion of the activation member is configured to extend into an end of the clamp, and a flange portion of the activation member is configured to extend over the end of the clamp.

8. The tool assembly of claim 1, comprising an activation member coupling between the activation member and the clamp, and the activation member coupling facilitates axial movement of the activation member relative to the clamp on rotation of the activation member to activate the lock arrangement and actuate the seal arrangement.

9. The tool assembly of claim 8, wherein the activation member coupling is axially split, and a portion of the activation member coupling is disposed on each of a first circumferentially arranged element of the activation member and a second circumferentially arranged element of the activation member.

10. The tool assembly of claim 1, wherein the activation arrangement comprises a first activation arrangement operatively associated with the first lock arrangement, and a first seal arrangement and a second activation arrangement operatively associated with the second lock arrangement and the second seal arrangement.

11. The tool assembly of claim 1, wherein at least part of the cutting tool is disposed within a pressure competent cutting tool housing.

12. The tool assembly of claim 1, wherein, in a first configuration, the cutting tool is configured so that a cutter of the cutting tool is in a retracted position relative to the pipe, the cutter being movable from the retracted position to an extended position to engage the pipe.

13. The tool assembly of claim 1, wherein the isolation tool comprises a pressure competent isolation tool housing.

14. The tool assembly of claim 1, wherein the isolation tool comprises a spigot, and the spigot is moveable between a first retracted position and a second position in which a seal element of the isolation tool straddles the pipe.

15. The tool assembly of claim 1, wherein the tool assembly is operatively associated with a second isolation tool, the second isolation tool is configured for axial deployment into or through the pipe, wherein the second isolation tool is configured to provide a secondary isolation downstream of the first isolation provided by the isolation tool of the tool assembly.

16. The tool assembly of claim 1, provided in combination with at least one of a pipe fitting and a valve.

17. A method comprising the steps of:
providing a tool assembly according to claim 1;
activating the clamp to secure the tool assembly to the pipe;
activating the cutting tool to sever the pipe into a first pipe section and a second pipe section; and
deploying the isolation tool between the first pipe section and the second pipe section such that a seal element of the isolation tool isolates a section of the pipe.

18. A tool assembly for use in the isolation of, and intervention into, a pipe, the tool assembly comprising:
a clamp configured for location about a pipe;
a lock arrangement for securing the tool assembly to the pipe,
wherein the lock arrangement is configured for location within the clamp such that the lock arrangement is interposed between an inner surface of the clamp and an outer surface of the pipe on location of the clamp about the pipe, wherein the lock arrangement comprises a taper lock comprising a first lock member and a second lock member, and wherein a tapered inner surface of the first lock member is configured for co-operating with a tapered outer surface of the second lock member to urge the second lock member into engagement with the pipe to secure the tool assembly to the pipe, wherein at least one of:
    the first lock member comprises a plurality of separate elements or segments, and the first lock member elements or segments are coupled together by a first lock member coupling, wherein the plurality of separate elements or segments are a slot and pin restraint, or
    the second lock member comprises a plurality of lock elements or segments, and second lock member is coupled to the clamp by a second lock member coupling, wherein the plurality of separate elements or segments are a radial screw;
a cutting tool operatively associated with the clamp, the cutting tool configured to sever the pipe into a first pipe section and a second pipe section; and
an isolation tool operatively associated with the clamp, the isolation tool comprising a seal element configured for location between the first pipe section and the second pipe section to isolate a section of the pipe.

19. A method comprising:
providing a tool assembly according to claim 18;
activating the clamp to secure the tool assembly to the pipe;
activating the cutting tool to sever the pipe into a first pipe section and a second pipe section; and
deploying the isolation tool between the first pipe section and the second pipe section such that a seal element of the isolation tool isolate a section of the pipe.

* * * * *